United States Patent
Kang et al.

(10) Patent No.: US 6,925,684 B2
(45) Date of Patent: Aug. 9, 2005

(54) ONE STEP AUTOMATIC HINGE DEVICE AND INFORMATION TERMINAL

(75) Inventors: Sung-Ill Kang, Kumi-shi (KR); Jong-Gun Bae, Kumi-shi (KR); Young-Chun Kim, Kumi-shi (KR)

(73) Assignee: Samsung Electronics Co., Ltd., Su-won (KR)

( * ) Notice: Subject to any disclaimer, the term of this patent is extended or adjusted under 35 U.S.C. 154(b) by 0 days.

(21) Appl. No.: 10/628,276

(22) Filed: Jul. 29, 2003

(65) Prior Publication Data

US 2004/0216273 A1 Nov. 4, 2004

(30) Foreign Application Priority Data

Apr. 30, 2003 (KR) ................................ 10-2003-0027403

(51) Int. Cl.[7] .............................................. B29C 13/06
(52) U.S. Cl. ........................... 16/264; 16/303; 16/354; 16/64; 455/90.3; 379/433.11; 379/433.12; 379/433.13; 49/333; 49/334; 49/335; 361/680
(58) Field of Search ................................ 361/680, 682, 361/683; 379/433.11, 433.12, 433.13; 49/333, 334, 335; 455/90.3; 16/264, 349, 330, 342, 303, 334, 329, 331, 354, 79, 69, 64

(56) References Cited

U.S. PATENT DOCUMENTS

| | | | | |
|---|---|---|---|---|
| 5,106,354 A | * | 4/1992 | Russ et al. | 475/342 |
| 5,799,371 A | * | 9/1998 | Lin | 16/330 |
| 6,175,990 B1 | * | 1/2001 | Kato et al. | 16/334 |
| 2004/0107537 A1 | * | 6/2004 | Ahn et al. | 16/221 |
| 2004/0203522 A1 | * | 10/2004 | Lim | 455/90.3 |

FOREIGN PATENT DOCUMENTS

| | | | | | |
|---|---|---|---|---|---|
| JP | 2001203763 A | * | 7/2001 | | H04L/25/02 |
| JP | 2003056545 A | * | 2/2003 | | F16C/11/04 |
| JP | 2003198664 A | * | 7/2003 | | H04M/1/00 |
| JP | 2004015606 A | * | 1/2004 | | H04M/1/00 |
| JP | 2004052895 A | * | 2/2004 | | F16C/11/10 |
| JP | 2004064119 A | * | 2/2004 | | H04M/1/02 |
| KR | 2002035553 A | * | 5/2002 | | H04B/1/38 |

* cited by examiner

*Primary Examiner*—Chuck Y. Mah
*Assistant Examiner*—Mark Williams
(74) *Attorney, Agent, or Firm*—Roylance, Abrams, Berdo & Goodman, L.L.P.

(57) ABSTRACT

A hinge device of an information terminal, wherein the information terminal comprises a main body, a sub-body to be opened away from or closed to the main body while rotating about a hinge axis extending in one direction of the main body, and the hinge device for rotatably coupling the main body to the sub body. The hinge device comprises a driving part generating a driving force for rotating the sub body, and a clutch part for rotating the sub-body by the driving force of the driving part. When the sub-body rotates by external force, the clutch part prevents rotating force of the sub-body from being transmitted to the driving part. Such a hinge device configured as stated above allows the user to automatically open and close the sub-body of the information terminal by virtue of a driving motor provided therein, as well as to manually open and close it. Further, the user can freely adjust an opening angle of the sub-body to various angles, resulting in improvement in convenience of use. Furthermore, a clutch function provided in the hinge device prevents external force from affecting the driving motor.

19 Claims, 9 Drawing Sheets

ONE STEP AUTOMATIC HINGE DEVICE AND INFORMATION TERMINAL

PRIORITY

This application claims priority to an application entitled "ONE STEP AUTOMATIC HINGE DEVICE AND INFORMATION TERMINAL THEREWITH", filed in the Korean Industrial Property Office on Apr. 30, 2003 and assigned Serial No. 2003-27403, the contents of which are hereby incorporated by reference.

BACKGROUND OF THE INVENTION

1. Field of the Invention

The present invention relates to an information terminal including cellular phones, PDAs, palm PCs and the like, and more particularly, to a hinge device of an information terminal for rotatably coupling a main body and a sub-body of the terminal.

2. Description of the Related Art

Mobile communication services, which have gradually developed from initial pager services, provide various data communications which include multi-media information as well as voice. In accordance with these developments, terminals for use in mobile communication services are developing into an information terminal form, which integrates functions of cellular phones, personal computers and multi-media appliances. Such information terminals are much leaner and lighter than existing devices, thereby maximizing portability.

In the case of cellular phones, for example, bar type terminals have been used mainly during their initial development stage. The bar type terminal is configured so that its single body housing is provided with receiver and transmitter modules, a display device and a keypad. The bar type terminals are limited in their miniaturization due to a required minimal distance between the receiver and transmitter modules. In order to solve the limitation in miniaturization of terminals, folder type terminals are used. Folder type terminals comprise a main body, a sub-body and a hinge device for rotatably coupling the main body with the sub body. The sub-body is configured to rotate, thereby being opened away from, and closed to, the main body. In a conversation mode, the sub-body of the folder type terminal rotates to be opened away from the main body, thereby ensuring a sufficient distance between transmitter and receiver modules of the terminal. In a call waiting mode, however, the sub-body of the terminal is folded to come into contact with the main body, resulting in an increase in portability. This configuration of the terminal using the hinge device is utilized for miniaturization of various information terminals, such as electronic notepads, notebook PCs and the like.

One example of a hinge device used in folder-type terminals is disclosed in U.S. Pat. No. 6,292,980 (the '980 patent), issued to Yi, et al., on Sep. 25, 2001, the entire contents of which are incorporated herein by reference. The disclosed hinge device disclosed in the '980 patent is designed to rotatably couple a main body and a sub-body of a terminal. If the user rotates the sub-body of the terminal to be opened away from the main body in excess of a predetermined angle, the hinge device provides a driving force allowing the sub-body to be forced toward its open position, without requiring any additional external force. If the user rotates the sub-body of the terminal below the predetermined angle, the hinge device provides a driving force for causing the sub-body to be forced to come into close contact with the main body.

However, disclosed conventional hinge devices discussed above still have shortcomings in that they are simply devices for opening and closing the sub-body of folder-type terminals. It is difficult to adjust an opening angle of the sub-body using the aforementioned hinge device, and therefore is inconvenient to use in that the user has to manually open and close the sub-body.

SUMMARY OF THE INVENTION

Therefore, the present invention has been made in view of the above described problems, and it is an object of the present invention to provide a one step automatic hinge device and an information terminal therewith, which enables a sub-body of the terminal to be automatically opened away from, and closed to, a main body of the terminal.

It is another object of the present invention to provide a one step automatic hinge device and an information terminal therewith, which can freely adjust an opening angle of a sub-body provided in the terminal at the user's request.

In accordance with one aspect of the present invention, the above and other objects can be accomplished by the provision of a hinge device having a driving motor, and a reduction module for reducing the revolutions per minute (RPM) of the driving motor, comprising a driving shaft for receiving a rotating force of the driving motor transmitted through the reduction module, and a driving cam capable of linearly reciprocating on a part of the driving shaft in a longitudinal direction thereof while being coupled to the driving shaft to rotate according to rotation of the driving shaft, the driving cam being formed at one end thereof with a plurality of longitudinally extending teeth spaced apart from each other at equal angles, The hinge device further comprises a driven cam installed to receive elastic force so as to tightly engage with the driving cam in a state in which it faces the driving cam, the driven cam being formed at one end thereof with a plurality of teeth spaced apart from each other at equal angles to be engaged with the teeth of the driving cam, thereby simultaneously rotating according to rotation of the driving cam. Hence, if the driven cam rotates by external force, the teeth of the driving cam are disengaged from the teeth of the driven cam, thereby preventing a driving force of the driven cam from being transmitted to the driving cam.

In accordance with another aspect of the present invention, there is provided a hinge device of an information terminal comprising a main body, a sub-body to be opened away from or closed to the main body while rotating about a hinge axis extending in one direction of the main body, and the hinge device for rotatably coupling the main body to the sub body, the hinge device comprising a driving part generating a driving force for rotating the sub body, and a clutch part for rotating the sub-body by the driving force of the driving part, whereby, when the sub-body rotates by external force, the clutch part preventing rotating force of the sub-body from being transmitted to the driving part.

In accordance with a further aspect of the present invention, the above and other objects can be accomplished by the provision of an information terminal comprising a main body formed at a front surface thereof with a display device, a sub-body coupled to one side of the main body to rotate relative to the main body, thereby exposing and covering the display device, and a support rotatably coupled to a rear surface of the main body, the support operating to be spread by a certain angle for supporting the main body in a state in which the main body is inclined by a certain angle from a certain surface on which the terminal is disposed. The information terminal further comprises a one step hinge device having a driving part generating a driving force for rotating the sub-body and a clutch part for rotating the sub-body by the driving force of the driving part. Hence, when the sub-body rotates, the one step hinge device prevents rotating force of the sub-body from being transmitted to the driving part.

BRIEF DESCRIPTION OF THE DRAWINGS

The above and other objects, features and other advantages of the embodiments of the present invention will be more clearly understood from the following detailed description taken in conjunction with the accompanying drawings, in which.

DETAILED DESCRIPTION OF THE PREFERRED EMBODIMENTS

Certain embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. Also, the terms used in the following description are terms defined taking into consideration the functions obtained in accordance with the embodiments of the present invention. The definitions of these terms should be determined based on the whole content of this specification because it may be changed in accordance with the desire of a user or a usual practice.

Figure 1:
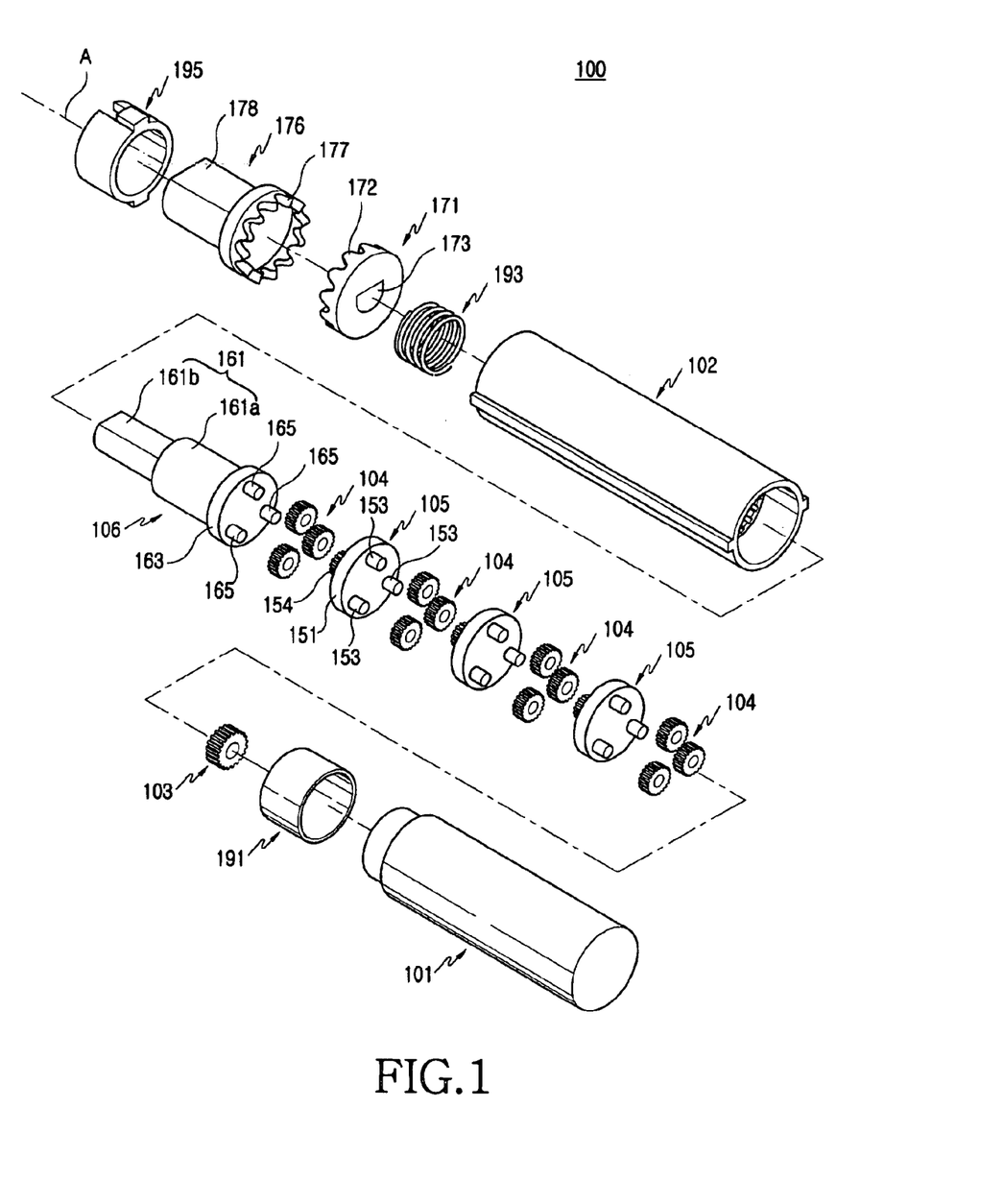
FIG. 1 is an exploded perspective view illustrating a hinge device of an information terminal in accordance with an embodiment of the present invention.
Figure 3:
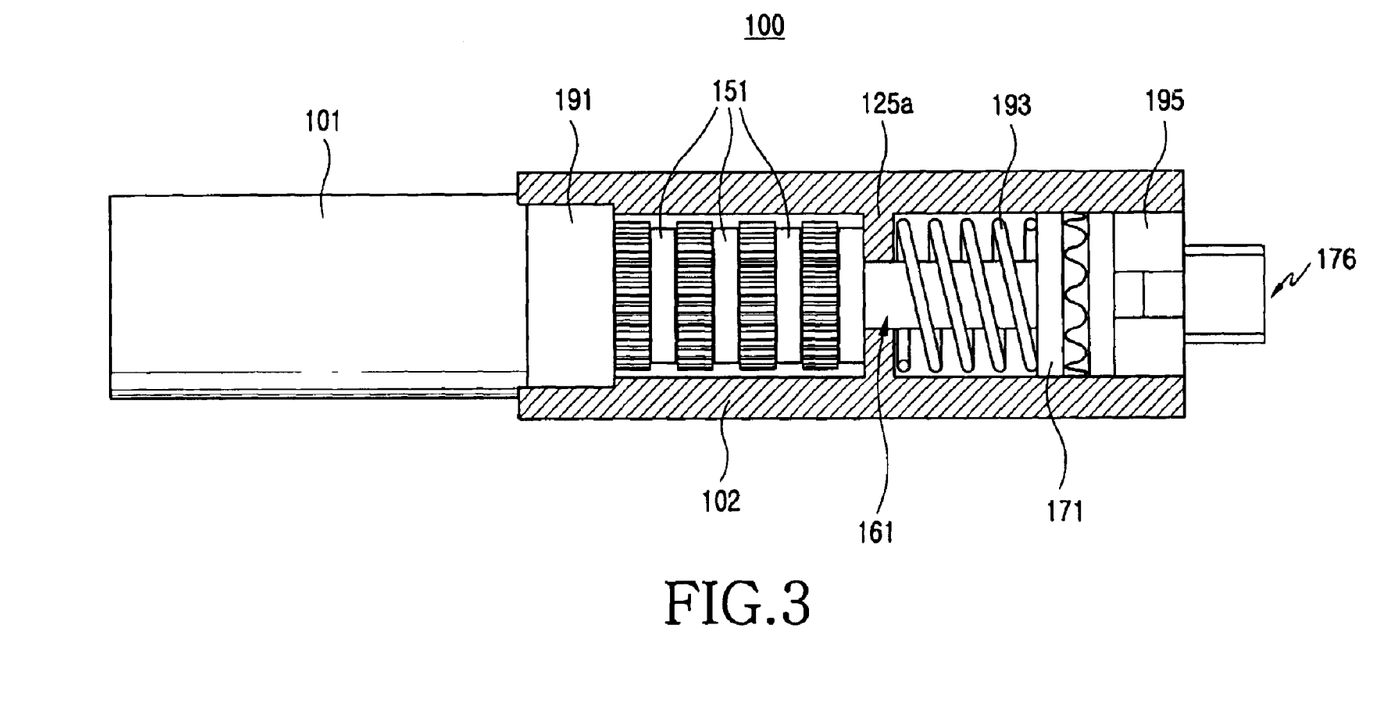
FIG. 3 is a sectional view illustrating the interior configuration of the housing of the hinge device shown in FIG. 1.

FIG. 1 is an exploded perspective view illustrating a hinge device, designated as reference numeral 100, of an information terminal in accordance with an embodiment of the present invention. FIG. 3 is a sectional view illustrating the interior configuration of a housing of the hinge device 100 shown in FIG. 1. As shown in FIGS. 1 and 3, the hinge device 100 of an information terminal, in accordance with an embodiment of the present invention, comprises a housing 102, a driving motor 101, a reduction module, a driving shaft 106, a driving cam 171 and a driven cam 176. The reduction module is organized by a combination of a plurality of gears received within the housing 102, and adapted to transmit the driving force of the driving motor 101 coupled at one end of the housing 102. The driving force transmitted through the reduction module is used to rotate the driving shaft 106. The driving motor 101 and reduction module act as a driving part of the hinge device 100. The driving shaft 106, driving cam 171 and driven cam 176, act as a clutch part for preventing external force from being transmitted to the driving part while being operated by the driving part.

Figure 2:
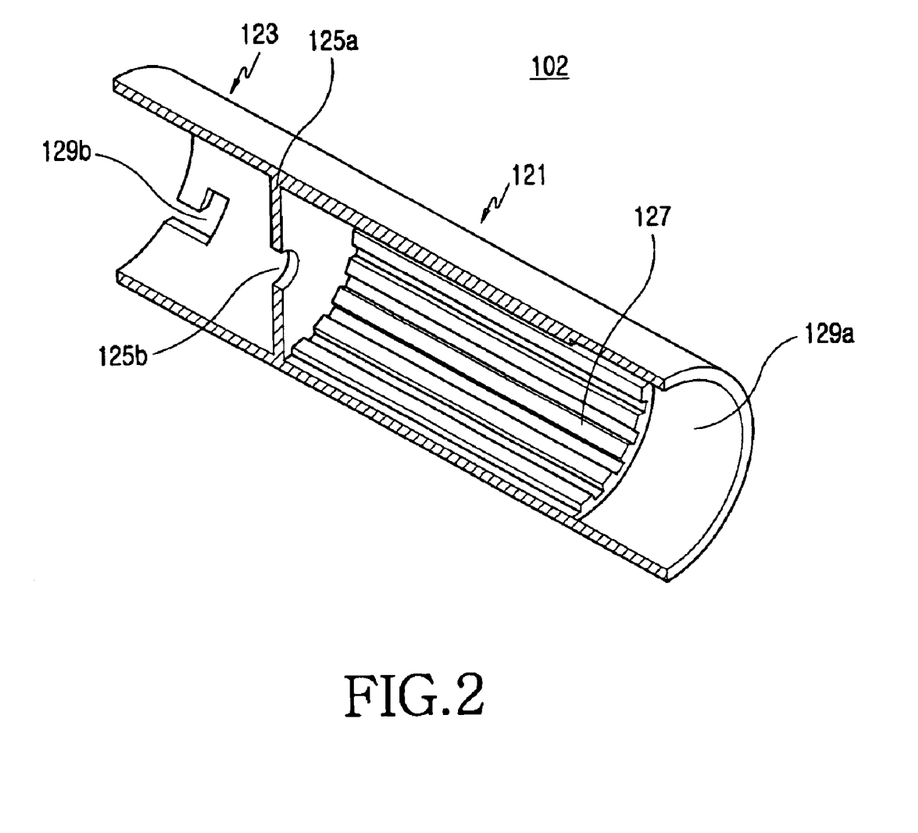
FIG. 2 is a partial cut away perspective view illustrating a housing of the hinge device shown in FIG. 1.

FIG. 2 is a partial cut away perspective view illustrating the housing 102 of the hinge device 100 shown in FIG. 1. Referring to FIG. 2, the hinge housing 102 comprises a first module housing 121, in which the reduction module is to be installed, and a second module housing 123, in which the driving shaft 106, driving cam 171 and driven cam 176 are to be installed. The housing 102 is comprised therein with a vertical partition 125a, which divides the interior space of the housing 102 into the first module housing 121 and second module housing 123. The partition 125a is formed at its center portion with a perforated hole 125b. The first module housing 121 is provided with a guide gear 127 at the whole inner peripheral surface thereof, except one end region thereof opposite to the partition 125a. The guide gear 127 comprises a plurality of longitudinally extending teeth, which are spaced apart from each other at equal angles. The end region of the first module housing 121, not formed with the guide gear 127, is provided at the inner peripheral surface thereof with a coupling portion 129a, to which the driving motor 101 is to be coupled. The driving motor 101 is coupled to the end region of the first module housing 121 by interposing a dummy housing 191 (shown in FIG. 1) therebetween.

The second module housing 123 is coupled with a housing cap 195 (shown in FIG. 1) at one end thereof opposite to the partition 125a. The housing cap 195 serves to prevent the driving cam 171 and driven cam 176 from being separated from the second module housing 123. The housing cap 195 is formed at the outer peripheral surface thereof with certain steps, whereas the second module housing 123 is formed at the corresponding end thereof with coupling holes 129b, thereby providing coupling means of the housing cap 195.

Referring again to FIGS. 1 and 3, the reduction module comprises a first driving gear 103, three driven gears 104 and three driving plates 105. The driving gear 103 rotates by the driving motor 101, and the three driven gears 104 and driving plates 105 are engaged with the first driving gear 103 in order. Each driving plate 105 has three driving pins 153 at one surface of its driving disc 151 facing the three driven gears 104, so that the three driven gears 104 are fitted around the driving pins 153, respectively. Each driving plate 105 further has a second driving gear 154 at the other surface of the driving disc 151. In addition, another three driven gears 104 are installed adjacent to the other surface of the driving disc 151 provided at the driving plate 105 so that they are engaged with a second driving gear 154. The driven gears 104 are engaged with the first driving gear 103 as well as the guide gear 127.

Figure 4:
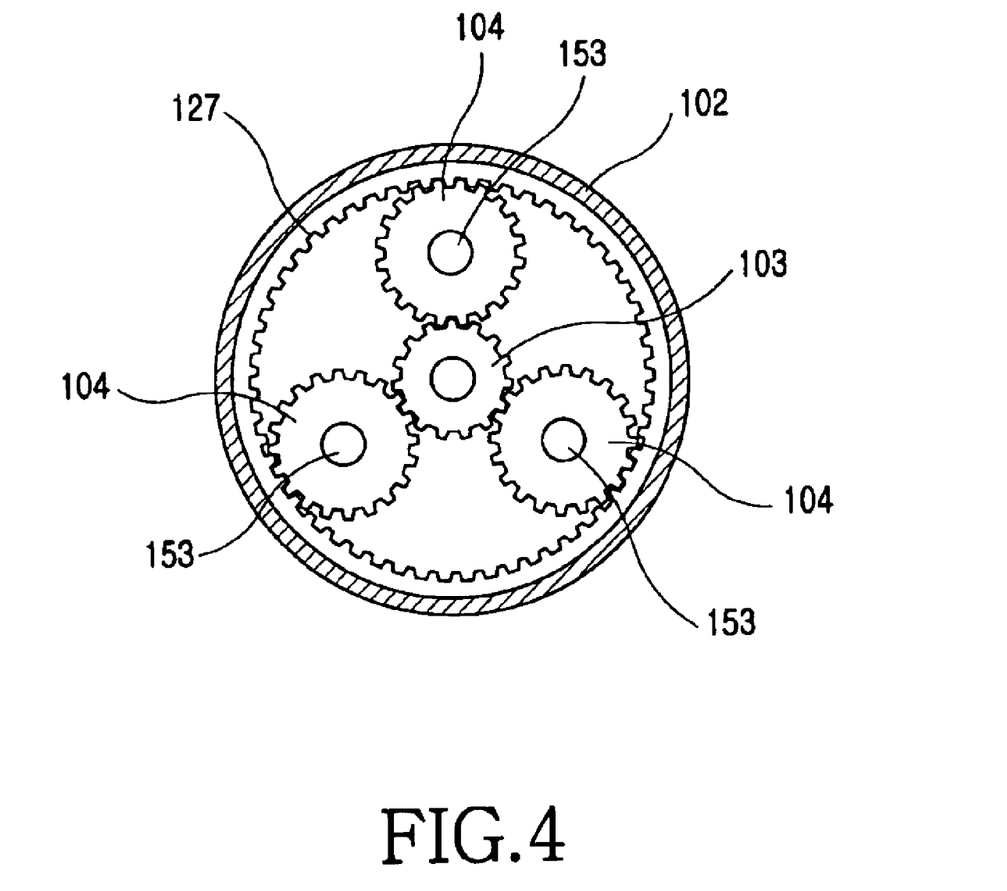
FIG. 4 is a view illustrating gears of a reduction module provided in the hinge device shown in FIG. 1.

In accordance with one embodiment of the present invention, the reduction module is configured such that in the first driving gear 103, at least two sets of the driving plates 105, the second driving gears 154 and driven gears 104 are arranged in series. This serial arrangement causes the RPM of the driving motor 101 to be reduced, while increasing the driving force of the driving motor 101 while being transmitted therethrough. Referring to FIG. 4, which illustrates the gears of the reduction module in detail, if the first driving gear 103 rotates in a clockwise direction, the three driven gears 104 rotate in a counterclockwise direction, respectively. According to such a counterclockwise rotation, the driven gears 104 are engaged with the guide gear 127, thereby moving along the circumferential direction of the guide gear 127. Therefore, the driving pins 153 move in a clockwise direction along the circumferential direction of the guide gear 127 within the first module housing 121, and the driving plate 105 also rotates in the clockwise direction. In this state, it can be clearly understood that the reduction ratio of the RPM of the driving motor 101 is determined according to the ratio of the radius of first driving gear 103 to the radius of driven gears 104. At the distal end of the reduction module, another set of three driven gears 104 is engaged with the second driving gear 154 of the driving plate 105.

Referring to FIG. 1, the driving shaft 106 comprises a rotating shaft 161, and a rotating disc 163 provided at one end of the rotating shaft 161, facing the reduction module. Similar to the driving plate 105, the rotating disc 163 is formed at one surface thereof with three driving pins 165 extending outwardly toward the driven gears 104 located at the distal end of the reduction module. The driven gears 104 are rotatably fitted around the driving pins 165 of the rotating disc 163. The rotating shaft 161 includes a cylindrical section 161a, and a flat section 161b. The flat section 161b extends by a certain distance at the opposite side to the rotating disc 163 and has a "D"-shaped cross section. The driving shaft 106 enters the housing 102 from the side of the first module housing 121, and then the rotating shaft 161 of the driving shaft 106 is positioned inside the second module housing 123 after passing through the perforated hole 125b of the partition 125a. In this state, the rotating disc 163 of the driving shaft 106 remains inside the first module housing 121 while being supported by the partition 125a. Since the driven gears 104 of the reduction module are coupled around the driving pins 165 of the rotating disc 163, respectively, as the driving motor 101 rotates, the driving shaft 106 rotates at an RPM determined by the reduction ratio created by the reduction module.

The driving cain 171 is formed with a shaft hole 173 having a shape corresponding to the "D"-shaped cross section of the flat section 161b of the rotating shaft 161 provided in the driving shaft 106. The driving cam 171 has formed along the peripheral edge of one surface opposite to the driving shaft 106 a plurality of longitudinally extending teeth (teeth) 172 spaced apart from each other at equal angles. The driving cam 171, fitted around the driving shaft 106 through the shaft hole 173 thereof, linearly reciprocates within a range corresponding to the length of the flat section 161b while rotating along with the driving shaft 106.

The driven cam 176 is provided with a plurality of teeth 177 at the surface facing the driving cam 171, corresponding to the teeth 172 of the driving cam 171, and at the other surface thereof with a hinge protrusion 178. The driven cam 176 is rotatably received in the second module housing 123.

In order to cause the teeth 172 of the driving cam 171 to be tightly engaged with the teeth 177 of the driven cam 176, a coil spring 193 is provided inside the second module housing 123. The coil spring 193 is supported at one end thereof by the partition 125a, and at the other end thereof by the other surface of the driving cam 171.

As discussed above, the housing cap 195 is coupled to one end of the second module housing 123 opposite to the partition 125a. The housing cap 195 prevents the driven cam 176, driving cam 171 and coil spring 193 from being separated from the second module housing 123 while allowing the hinge protrusion 178 to protrude outwardly therefrom through an opening formed therein.

According to the hinge device 100 configured as discussed above, as the driving motor 101 rotates, the RPM of the driving shaft 106 and driving cam 171 is reduced by the reduction module. Accordingly, since the driving cam 171 and driven cam 176 are tightly engaged with each other by the coil spring 193, the driven cam 176 also rotates at substantially the same RPM as the driving cam 171.

If the driven cam 176 rotates by external force, the driving cam 171 linearly moves to enter the second module housing 123, thereby causing the teeth 172 of the driving cam 171 to be separated from the teeth 177 of the driven cam 176. Therefore, the rotating force of the driven cam 176 generated by external forces does not transmit to the reduction module or driving motor 101. While the driven cam 176 rotates by the external force, the driving cam 171 linearly reciprocates and then generates a click sound at a certain time that the teeth 172 of the driving cam 171 become engaged again with the teeth 177 of the driven cam 176. The intervals of the teeth 172 and 177 formed at the driving cam 171 and driven cam 176, create a stoppage angle of the driven cam 176, which can be set at various angles. For example, if the teeth 172 and 177 of the driving cam 171 and driven cam 176 are spaced apart from each other at equal intervals of 15°, the rotation of the driven cam 176 is stopped at intervals of 15°.

Figure 5:
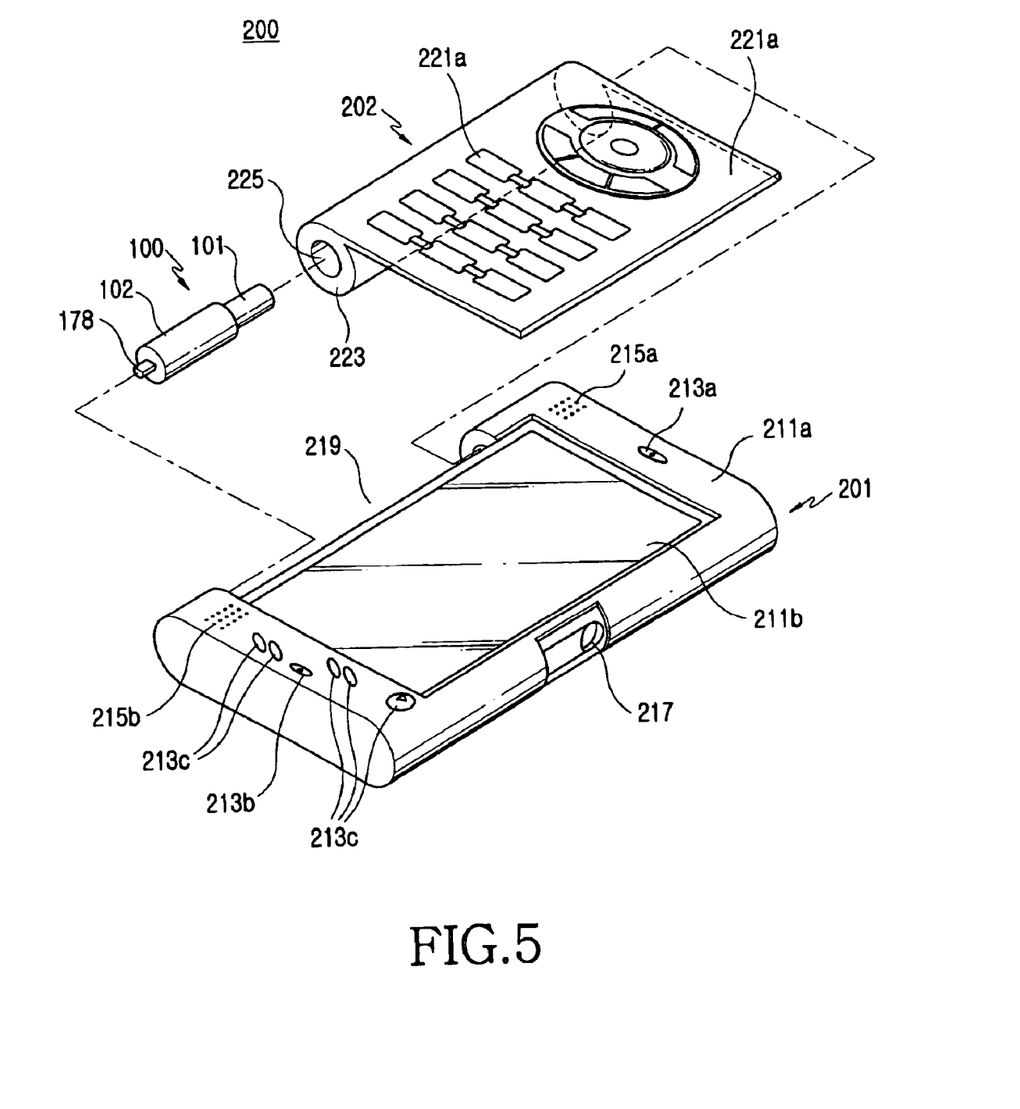
FIG. 5 is an exploded perspective view illustrating a state in which the hinge device shown in FIG. 1 is assembled within an information terminal.
Figure 6:
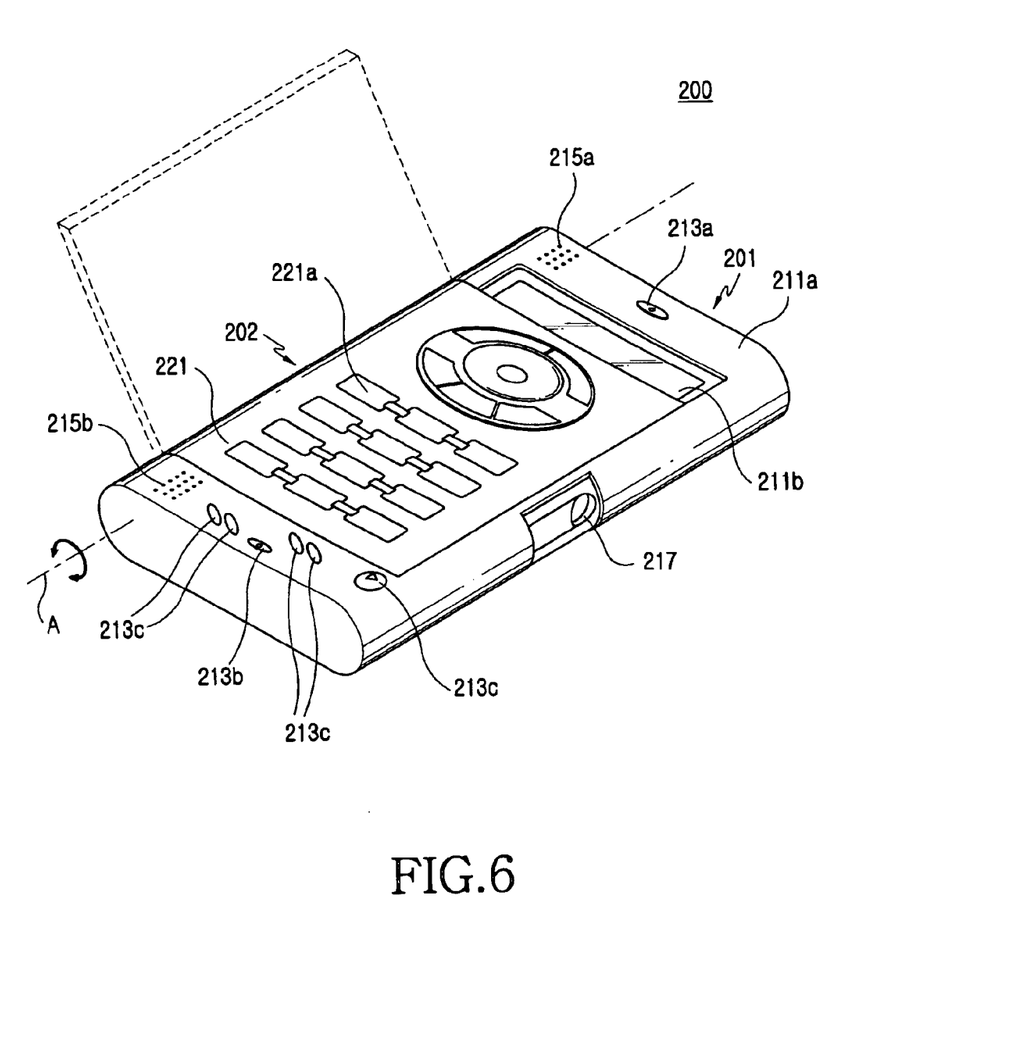
FIG. 6 is a perspective view illustrating an assembled state of the information terminal shown in FIG. 5.
Figure 7:
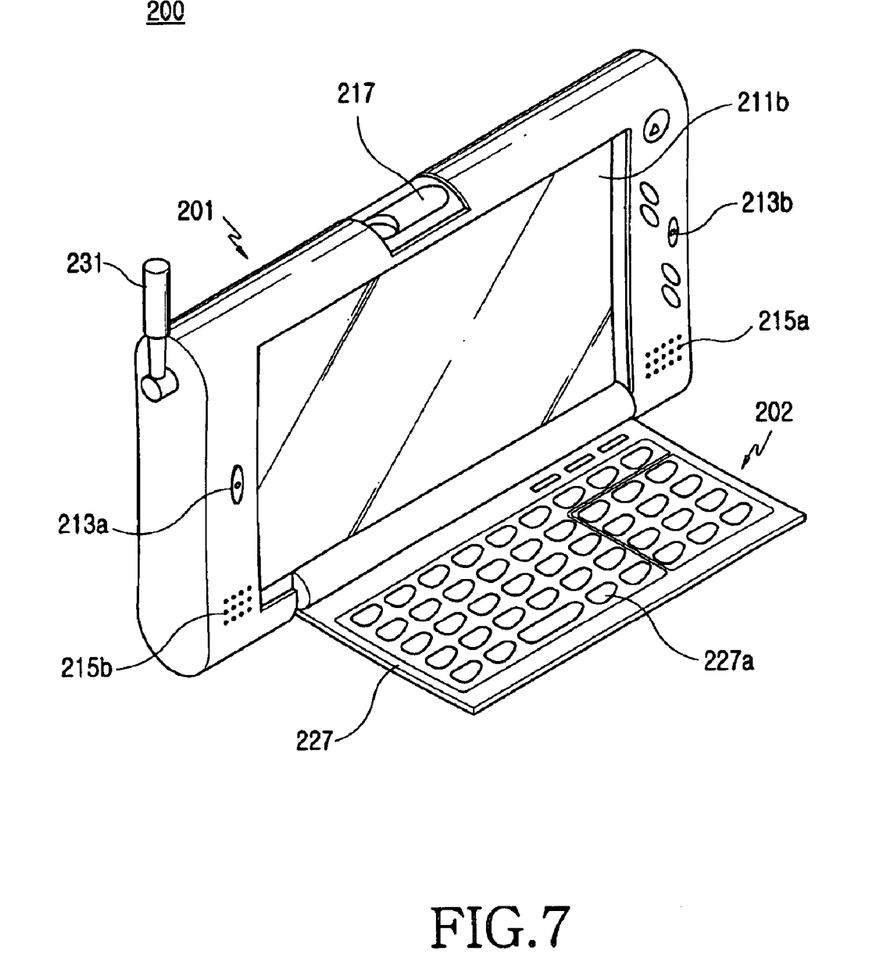
FIG. 7 is a perspective view illustrating a state wherein a sub-body of the information terminal is opened away from a main body of the terminal.

FIGS. 5 to 7 shows an information terminal, designated as reference numeral 200, which has the hinge device 100 configured as discussed above. The information terminal 200 comprises a main body 201 and a sub-body 202, which are rotatably coupled by the hinge device 100.

The main body 201 is provided with a receiver module 213a and a transmitter module 213b at the upper and lower ends of a front surface 211a, respectively, and speaker modules 215a and 215b at respective sides of the upper and lower ends. Also, an antenna unit 231 is installed at the upper end of the main body 201. Between the receiver module 213a and transmitter module 213b, a display device 211b is installed, and a camera module 217 is installed at one side of the display device 211b. In addition, a plurality of keys 213c can be installed at a position adjacent to the transmitter module 213b, and a slot 219 is longitudinally formed at one side of the main body 201 opposite to the camera module 217 for defining a certain space, into which the sub-body 202 is to be coupled.

The sub-body 202 is provided with a first keypad 221a at a front surface 221 thereof, for performing functions of communication terminals such as cellular phones, and a second keypad 227a at a rear surface 227 thereof (shown in FIG. 7), for performing functions of information appliances such as PDAs. The sub-body 202 is formed at one side thereof with a hinge arm 223, which is rotatably coupled into the slot 219 of the main body 201. The hinge arm 223 is formed with a hinge hole 225. As the hinge device 100 is received in the hinge hole 225, a hinge axis A is provided (shown in FIG. 6). The sub-body 202 rotates about, and is located on, the hinge axis A, thereby being opened away from, and closed to, the main body 201, about the hinge axis A. The hinge protrusion 178 protruded outwardly from one end of the hinge device 100 is fixed to the main body 201.

Referring now to FIG. 6, when the sub-body 202 is in close contact with the main body 201, the information terminal 200 is used as a communication appliance. On the other hand, as shown in FIG. 7, when the sub-body 202 is opened away from the main body 201, the information terminal 200 is used as an information appliance, enabling data searching and input work via the display device 211b and second key pad 227a.

Figure 8:
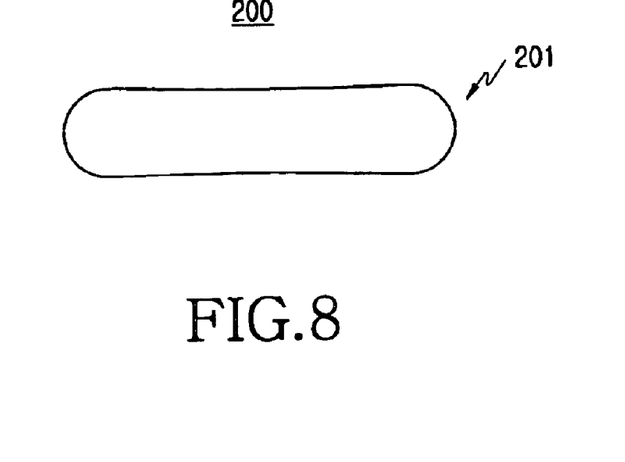
FIGS. 8 to 10 are side views, successively illustrating the opening operation of the sub-body of the information terminal shown in FIG. 6.
Figure 9:
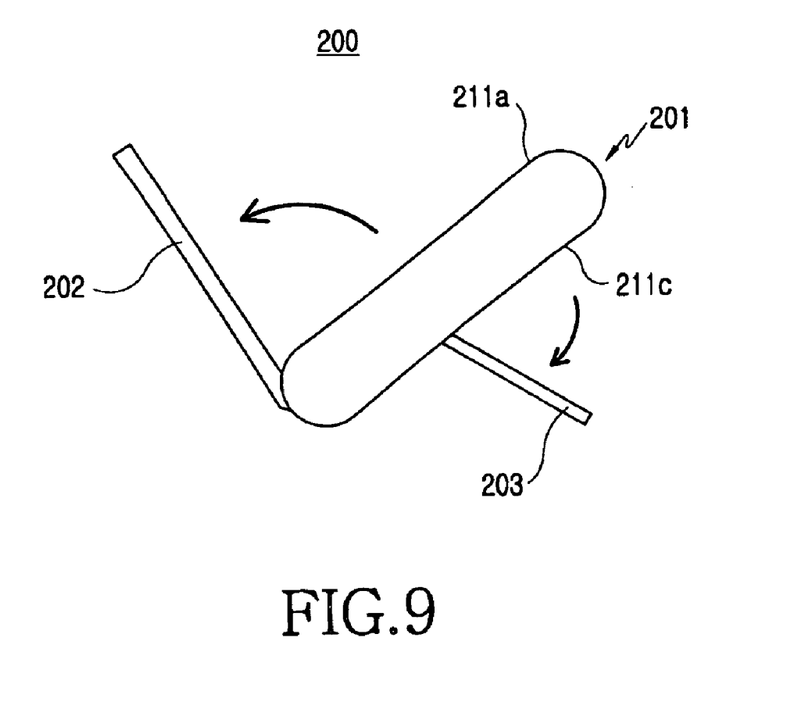
Figure 10:
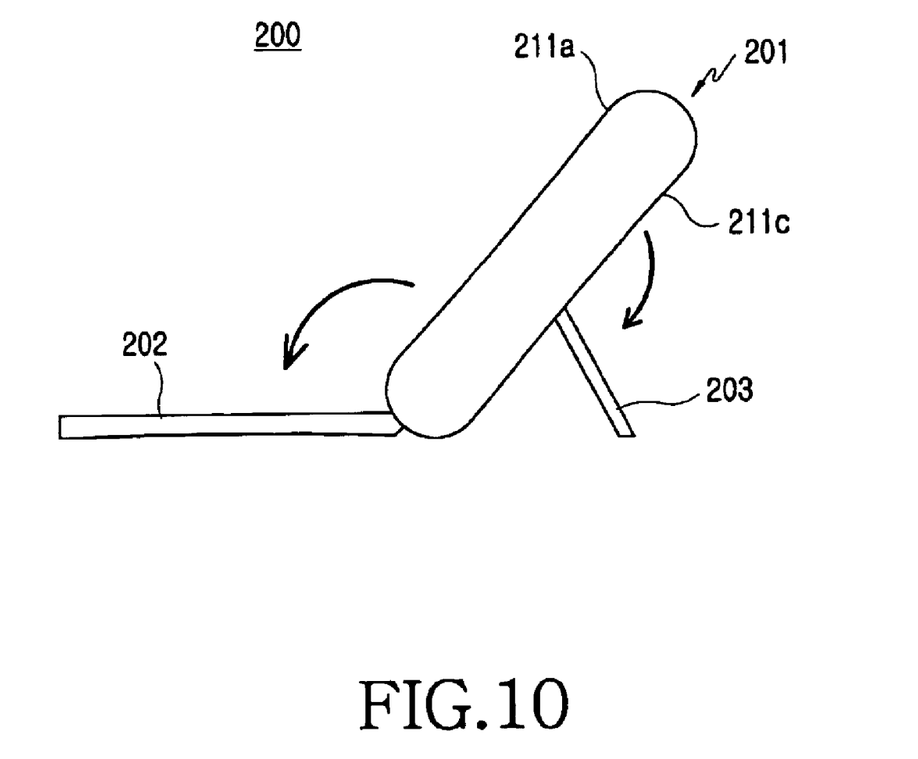

FIGS. 8 to 10 are side views of the information terminal 200, explaining the opening and closing operations of the sub-body 202. The main body 201 is provided at a rear surface 211c thereof with a certain support 203 rotatably coupled thereto. The support 203 is designed to be spread at the same time as the sub-body 202 is opened. After the sub-body 202 is completely opened, the support 203 is spread such that the front surface 221 of the sub-body 202 faces a certain flat surface on which the terminal 200 is disposed, thereby causing the main body 201 to be inclined at a certain angle relative to the flat surface. Therefore, the user can conveniently use the information terminal 200 by placing it on the flat surface.

The sub-body 202 of the information terminal 200 configured as discussed above allows the user to manually open and close it. In addition to such a manual manipulation, the sub-body 202 can be automatically opened away from and closed to the main body 201 using the hinge device 100. This is provided by endowing one of the keys 213c installed at the main body 201 with an opening/closing function. When the sub-body 202 is in close contact with the main body 201 and the user pushes the opening/closing key, the driving motor 101 is operated, causing the sub-body 202 to be opened away from the main body 201 up to a certain angle. If the sub-body 202 is opened up to a predetermined angle via one time operation of the driving motor 101, the driving motor 101 is controlled to maintain a stoppage state thereof, until the user again pushes the opening/closing key. In an opened state of the sub-body 202, the user can manually adjust an opening angle of the sub-body 202 in order to watch the display device 211b at a convenient position. The user can manually rotate the sub-body 202 or main body 201. This is allowed since, when the driven cam 176 rotates by the external force, the driving cam 171 linearly reciprocates and is stopped at a position where the teeth 172 of the driving cam 171 are engaged with the teeth 177 of the driven cam 176. The opened sub-body 202 is closed to the main body 201 if the user again pushes the opening/closing key or manually closes the sub-body 202 to come into close contact with the main body 201.

As apparent from the above description, the embodiments of the present invention provide a hinge device of an information terminal, which has a driving motor to allow a sub-body of the terminal to be automatically opened away from or closed to a main body of the terminal via only one time button manipulation. Further, according to another embodiment of the present invention, the user can fix the sub-body at a convenient position by adjusting an opening angle thereof, resulting in convenient use of the terminal. Furthermore, even though the user manually opens and closes the sub body, a clutch function provided in the hinge device prevents the externally applied force from affecting the driving motor, resulting in an increase in reliability of the product.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hinge device having a driving motor and a reduction module for reducing revolutions per minute of the driving motor, comprising:
   a driving shaft for receiving a rotating force of the driving motor transmitted through the reduction module, the driving shaft having a flat section with a "D"-shaped cross section over a certain length;
   a driving cam capable of linearly reciprocating on a part of the driving shaft in a longitudinal direction within a range of the flat section having the "D"-shaped cross section, the driving cam being coupled to the driving shaft to rotate according to rotation of the driving shaft, the driving cam being formed at one end thereof with a plurality of longitudinally extending teeth spaced apart from each other at equal angles; and
   a driven cam installed to receive elastic force so as to tightly engage with the driving cam in a state in which it faces the driving cam, the driven cam being formed at one end thereof with a plurality of teeth spaced apart from each other at equal angles to be engaged with the teeth of the driving cam, thereby simultaneously rotating according to rotation of the driving cam,
   wherein, if the driven cam rotates by external force, the teeth of the driving cam are disengaged from the teeth of the driven cam, thereby preventing a driving force of the driven cam from being transmitted to the driving cam.

2. The hinge device as set forth in claim 1, further comprising:
   a coil spring supported at one end thereof by one end of the driving shaft, thereby providing the elastic force in a direction for causing the teeth of the driving cam to engage with the teeth of the driven cam.

3. The hinge device as set forth in claim 1, wherein the reduction module comprises a plurality of gear arrays, which reduce the revolutions per minute of the driving motor, and at the same time, increase a driving force of the driving motor, thereby transmitting the reduced revolutions per minute and increased driving force to the driving shaft.

4. The hinge device as set forth in claim 1, wherein the reduction module comprises:
   a housing having a guide gear formed at an inner peripheral surface thereof with a plurality of longitudinally extending teeth spaced apart from each other at equal angles;
   a first driving gear installed inside the housing to rotate by the rotating force of the driving motor;
   a driving plate provided at one surface thereof with three outwardly extending driving pins spaced apart from each other at equal angles and at the other surface thereof with an outwardly protruding second driving gear; and
   driven gears rotatably coupled to the driving pins of the driving plate, respectively, the driven gears being engaged with the guide gear of the housing and the first driving gear.

5. The hinge device as set forth in claim 4, wherein the reduction module further comprises:
   second driven gears to be engaged with the guide gear of the housing and the second driving gear; and
   a second driving plate provided at one surface thereof with three outwardly extending driving pins spaced apart from each other at equal angles, to which the second driven gears are rotatably coupled, respectively, and at the other surface thereof with an outwardly extending third driving gear.

6. The hinge device as set forth in claim 4, wherein the reduction module further comprises:
a second driving plate provided at one surface thereof with three outwardly extending driving pins spaced apart from each other at equal angles and coupled at the other surface thereof to an end of the driving shaft; and
second driven gears rotatably coupled to the driving pins of the second driving plate, respectively, the driven gears being engaged with the guide gear of the housing and the second driving gear.

7. The hinge device as set forth in claim 1, further comprising:
a housing coupled to an end of the driving motor at one end thereof, the housing being divided into a first module housing and a second module housing by a certain partition formed with a perforated hole, the first module housing being formed at an inner peripheral surface thereof with a guide gear having a plurality of longitudinally extending teeth spaced apart from each other at equal angles,
wherein:
the reduction module comprises a plurality of gear arrays located inside the first module housing, the reduction module reducing the revolutions per minute of the driving motor, and at the same time, increasing a driving force of the driving motor; and
the driving shaft is protruded at one end region thereof into the first module housing while being received in the second module housing, thereby receiving the rotating force of the driving motor via the reduction module.

8. The hinge device as set forth in claim 7, further comprising:
a coil spring supported at one end thereof by the partition and at the other end thereof by the driving cam, thereby providing the elastic force in a direction for causing the teeth of the driving cam to engage with the teeth of the driven cam.

9. The hinge device as set forth in claim 7, wherein the second module housing receives the driving shaft, driving cam and driven cam in order, and
the second module housing is coupled to a housing cap at one end thereof, the housing cap having a perforated opening, through which one end of the driven cam is protruded.

10. A hinge device of an information terminal comprising a main body, a sub-body to be opened away from or closed to the main body while rotating about a hinge axis extending in one direction of the main body, and the hinge device for rotatably coupling the main body to the sub body, the hinge device comprising:
a driving part generating a driving force for rotating the sub body, the driving part having a driving motor and a reduction module; and
a clutch part for rotating the sub-body by the driving force of the driving part, whereby, when the sub-body rotates by external force, the clutch part prevents rotating force of the sub-body from being transmitted to the driving part, the clutch part comprising:
a driving shaft formed with a flat section having a "D"-shaped cross section over a certain length, the driving shaft rotating by the driving force of the driving part;
a driving cam coupled to the driving shaft to linearly reciprocate within a range of the flat section of "D"-shaped cross section while rotating along with the driving shaft, the driving cam being formed at one end thereof with a plurality of longitudinally extending teeth spaced apart from each other at equal angles; and
a driven cam formed at a peripheral edge of one surface thereof facing the driving cam with a plurality of teeth spaced apart from each other at equal angles to be engaged with the teeth of the driving cam, thereby rotating along with the driving cam according to the rotation of the driving cam,
wherein, when the driven cam rotates by the external force, the driving cam moves on the driving shaft in a lengthwise direction thereof, thereby causing the teeth of the driving cam to be separated from the teeth of the driven cam.

11. The hinge device of the information terminal as set forth in claim 10, wherein the reduction module includes a plurality of gear arrays for reducing revolutions per minute of the driving motor and increasing the driving force of the driving motor, thereby transmitting the reduced revolutions per minute and increased driving force.

12. The hinge device of the information terminal as set forth in claim 11, wherein the reduction module further includes a first module housing coupled to one end of the driving motor at one end thereof, the first module housing being formed at an inner peripheral surface thereof with a guide gear having a plurality of longitudinally extending teeth spaced apart from each other at equal angles.

13. The hinge device of the information terminal as set forth in claim 10, further comprising:
a coil spring for providing elastic force to the driving cam in a direction for causing the teeth of the driving cam to tightly engage with the teeth of the driven cam.

14. The hinge device of the information terminal as set forth in claim 10, wherein:
the driving part further comprises a second module housing, in which the driving shaft, driving cam and driven cam are received in order;
the second module housing is received in the sub-body of the information terminal; and
the driven cam is protruded outwardly from the second module housing at the other end thereof, thereby being fixed to the main body of the information terminal.

15. The hinge device of the information terminal as set forth in claim 10, wherein:
the driving part comprises a driving motor, and a reduction module having a plurality of gear arrays arranged within a longitudinally extending first module housing to transmit the driving force of the driving motor;
the clutch part comprises a second module housing integrally extending from one end of the first module housing, a driving shaft rotating by receiving the driving force of the driving motor, a driving cam coupled to the driving shaft to linearly reciprocate thereon, and a driven cam rotating along with the driving cam according to rotation of the driving cam; and
when the driven cam rotates by external force, the driving cam linearly reciprocates to prevent rotating force of the driven cam generated by the external force from being transmitted to the driving motor.

16. An information terminal comprising:
a main body formed at a front surface thereof with a display device;
a sub-body coupled to one side of the main body to rotate relative to the main body, thereby exposing and covering the display device;

a support rotatably coupled to a rear surface of the main body, the support operating to be spread by a certain angle for supporting the main body in a state in which the main body is inclined by a certain angle from a certain surface on which the terminal is disposed; and
a one step hinge device having a driving part generating a driving force for rotating the sub-body, the driving part including a driving motor and a reduction module, and a clutch part for rotating the sub-body by the driving force of the driving part, the clutch part comprising;
  a driving shaft formed with a flat section having a "D"-shaped cross section over a certain length, the driving shaft rotating by the driving force of the driving part;
  a driving cam coupled to the driving shaft to linearly reciprocate within a range of the flat section of "D"-shaped cross section while rotating along with the driving shaft, the driving cam being formed at one end thereof with a plurality of longitudinally extending teeth spaced apart from each other at equal angles; and
  a driven cam formed at one end thereof with a plurality of teeth spaced apart from each other at equal angles to be engaged with the teeth of the driving cam, thereby rotating along with the driving cam according to rotation of the driving cam, and
  wherein, when the driven cam rotates by external force, the driving cam moves on the driving shaft in a lengthwise direction thereof, thereby causing the teeth of the driving cam to be separated from the teeth of the driven cam so that the one step hinge device prevents rotating force of the sub-body from being transmitted to the driving part.

17. The information terminal as set forth in claim 16, wherein in a state in which the sub-body is folded to come into close contact with the main body, the display device is partially exposed above one end of the sub body.

18. The information terminal as set forth in claim 16, wherein the sub-body is installed with first and second keypads at both surfaces thereof, respectively, each keypad having a plurality of key buttons.

19. The information terminal as set forth in claim 16, further comprising: a camera module installed at the other side of the main body.

* * * * *